US012149898B2

(12) United States Patent
Kanatsu

(10) Patent No.: US 12,149,898 B2
(45) Date of Patent: Nov. 19, 2024

(54) MICROPHONE AND MICROPHONE SYSTEM

(71) Applicant: Audio-Technica Corporation, Tokyo (JP)

(72) Inventor: Ryo Kanatsu, Tokyo (JP)

(73) Assignee: Audio-Technica Corporation, Tokyo (JP)

( * ) Notice: Subject to any disclaimer, the term of this patent is extended or adjusted under 35 U.S.C. 154(b) by 165 days.

(21) Appl. No.: 17/930,808

(22) Filed: Sep. 9, 2022

(65) Prior Publication Data

US 2023/0007391 A1 Jan. 5, 2023

Related U.S. Application Data

(63) Continuation of application No. PCT/JP2021/012528, filed on Mar. 25, 2021.

(30) Foreign Application Priority Data

Mar. 31, 2020 (JP) ................................. 2020-063306

(51) Int. Cl.
*H04R 3/00* (2006.01)
*H04R 5/04* (2006.01)

(52) U.S. Cl.
CPC ............... *H04R 3/005* (2013.01); *H04R 5/04* (2013.01)

(58) Field of Classification Search
CPC ....... H04R 3/005; H04R 5/04; H04R 2420/09
See application file for complete search history.

(56) References Cited

U.S. PATENT DOCUMENTS

| | | | | | |
|---|---|---|---|---|---|
| 2006/0104457 | A1* | 5/2006 | Kawaguchi | H04R 3/005 | 348/E7.083 |
| 2010/0259399 | A1* | 10/2010 | Tanno | G06F 13/4081 | 340/635 |
| 2012/0114159 | A1* | 5/2012 | Akino | H04R 1/406 | 381/369 |

FOREIGN PATENT DOCUMENTS

| | | | |
|---|---|---|---|
| JP | 2005-039531 | A | 2/2005 |
| JP | 2006-140930 | A | 6/2006 |
| JP | 2012-104991 | A | 5/2012 |

* cited by examiner

*Primary Examiner* — Akelaw Teshale
(74) *Attorney, Agent, or Firm* — WC&F IP

(57) ABSTRACT

A microphone includes: a first connection port for connecting to an external device; a second connection port for connecting to a second microphone via a cable; and a determination part that determines to be in a master mode, in which electric power is supplied through the second connection port to the second microphone connected via the cable, when the cable is connected to the second connection port in a state where electric power is supplied from the external device through the first connection port, and determines to be in a slave mode, in which electric power is supplied through the second connection port from the second microphone connected via the cable, when the cable is connected to the second connection port in a state where no electric power is supplied through the first connection port.

12 Claims, 8 Drawing Sheets

| CONNECTION DETERMINATION VOLTAGE | MODE DETERMINATION VOLTAGE | DETERMINATION RESULT |
|---|---|---|
| H | L | MASTER MODE |
| H | H | SLAVE MODE |
| L | L | STAND-ALONE MODE |
| L | H | ABNORMAL STATE |

FIG. 5

MICROPHONE AND MICROPHONE SYSTEM

CROSS-REFERENCE TO RELATED APPLICATIONS

The present application is a continuation application of International Application number PCT/JP2021/012528, filed on Mar. 25, 2021, which claims priority under 35 U.S.C § 119(a) to Japanese Patent Application No. 2020-063306, filed on Mar. 31, 2020. The contents of these applications are incorporated herein by reference in their entirety.

BACKGROUND OF THE INVENTION

The present disclosure relates to a microphone and a microphone system. Conventionally, a universal serial bus (USB) microphone which outputs collected sound to an information device by connecting a microphone and the information device with a USB has been known (for example, refer to Japanese Unexamined Patent Application Publication No. 2005-39531).

When a plurality of microphones are connected to one information device, a user has to provide, between the information device and the microphones, a device (for example, a mixer) for synthesizing sounds collected by the plurality of microphones. As a result, there is a problem that connecting the information device and the microphones is complicated.

BRIEF SUMMARY OF THE INVENTION

The present disclosure focuses on this point, and its object is to make it easy to connect an information device and a plurality of microphones.

A microphone according to a first aspect of the present disclosure is a microphone which is a first microphone that can be connected to (i) an external device capable of supplying electric power and (ii) a second microphone, the microphone including a first connection port for connecting to the external device; a second connection port for connecting to the second microphone via a cable; and a determination part that: determines to operate in a master mode, in which electric power is supplied through the second connection port to the second microphone connected via the cable, when the cable is connected to the second connection port in a state where electric power is supplied from the external device through the first connection port, and determines to operate in a slave mode, in which electric power is supplied through the second connection port from the second microphone connected via the cable, when the cable is connected to the second connection port in a state where no electric power is supplied from the external device through the first connection port.

A microphone system according to a second aspect of the present disclosure includes a first microphone; a second microphone connectable to the first microphone; and a cable for connecting the first microphone and the second microphone, wherein the first microphone and the second microphone each include: a first connection port for connecting to an external device capable of supplying electric power; a second connection port for connecting to another microphone among the first microphone and the second microphone via the cable; a determination part that determines to operate in a master mode, in which electric power is supplied through the second connection port to the another microphone connected via the cable, when the cable is connected to the second connection port in a state where electric power is supplied from the external device through the first connection port, and determines to operate in a slave mode, in which electric power is supplied through the second connection port from the another microphone connected via the cable, when the cable is connected to the second connection port in a state where no electric power is supplied from the external device through the first connection port.

BRIEF DESCRIPTION OF THE DRAWINGS

FIG. 5 shows determination results of the determination part 36 based on connection determination voltages and mode determination voltages.

DETAILED DESCRIPTION OF THE INVENTION

Hereinafter, the present disclosure will be described through exemplary embodiments, but the following exemplary embodiments do not limit the invention according to the claims, and not all of the combinations of features described in the exemplary embodiments are necessarily essential to the solution means of the invention.

Configuration of a Microphone System S

Figure 1:
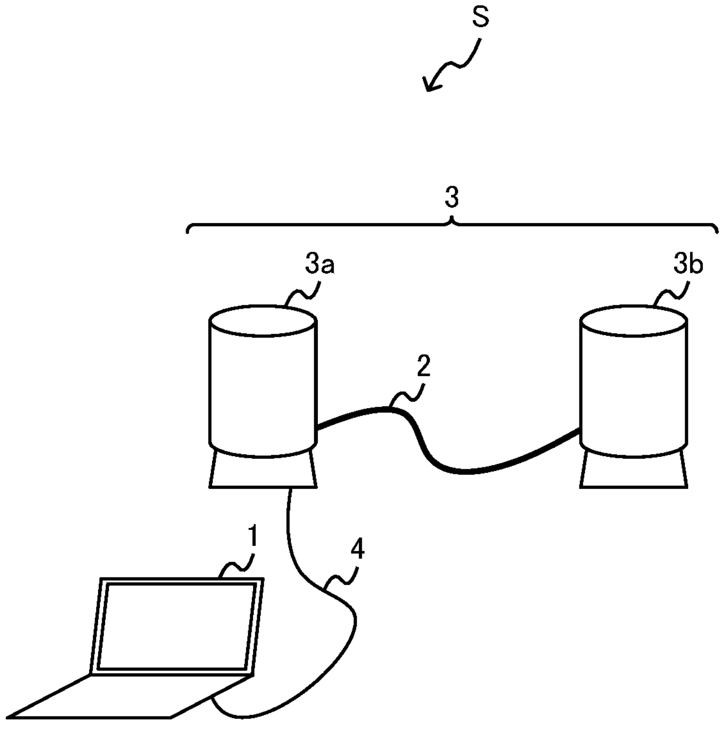
FIG. 1 shows a configuration of a microphone system S according to an embodiment of the present disclosure.

FIG. 1 shows a configuration of a microphone system S according to an embodiment of the present disclosure. The microphone system S includes an external device 1, a cable 2, a plurality of microphones 3 (microphones 3*a* and 3*b*), and a cable 4. The microphone system S is used in a state where the microphone 3*a* is connected to the external device 1 via the cable 4, and the microphone 3*a* and the microphone 3*b* are connected to each other via the cable 2, for example.

The external device 1 is a computer such as a personal computer, a tablet, or the like. The external device 1 is connected to the microphone 3*a* via a USB interface and the cable 4, for example. The external device 1 can supply electric power to the microphone 3*a* via the USB interface and the cable 4.

By executing application software for processing a sound signal acquired from the microphone 3*a* connected via the cable 4, the external device 1 acquires the sound signal output from the microphone 3*a*, for example. The sound signal is an electric signal having a waveform corresponding to a waveform of the sound collected by the microphone 3*a*.

The cable 2 is used to connect the microphone 3*a* and the microphone 3*b*. Connectors connectable to the microphone 3*a* and the microphone 3*b* are provided at the ends of the cable 2. The shape of the connectors provided in the cable 2 may be any shape, however, and may be a USB Type-C connector, for example. The cable 2 transmits electric power generated by the microphone 3*a* to the microphone 3*b*. The cable 2 transmits a sound signal based on sound collected by the microphone 3*b* to the microphone 3*a*.

The microphone 3 is audio equipment that collects sound around the microphone 3 and transduces the collected sound into the sound signal. One of the microphones 3 can be connected to the external device 1 and another microphone 3 (i.e., the microphone 3*b* in FIG. 1). Each of the plurality of microphones 3 has a plurality of operation modes which are switched among according to states of the connections with the microphone 3 other than itself and the external device 1. For example, in the example shown in FIG. 1, the microphone 3*a* connected to the external device 1 operates in a master mode, and the microphone 3*b* connected to the microphone 3*a* via the cable 2 operates in a slave mode.

The microphone 3*a* receives electric power from the external device 1 and supplies electric power to the microphone 3*b* via the cable 2. The microphone 3*a* synthesizes (i) the sound signal based on the sound collected by the microphone 3*a* and (ii) the sound signal acquired from the microphone 3*b*. The microphone 3*a* outputs the synthesized sound signal to the external device 1.

The microphone 3*b* is connected to the microphone 3*a* via the cable 2. The microphone 3*b* receives electric power from the microphone 3*a* via the cable 2. The microphone 3*b* outputs the sound signal based on the sound collected by the microphone 3*b* to the microphone 3*a* via the cable 2.

The cable 4 connects the external device 1 and the microphone 3*a*. One end of the cable 4 is connected to the USB interface of the external device 1, and the other end of the cable 4 is connected to the connector of the microphone 3*a*.

Internal Configuration of the Microphone 3

Figure 2:
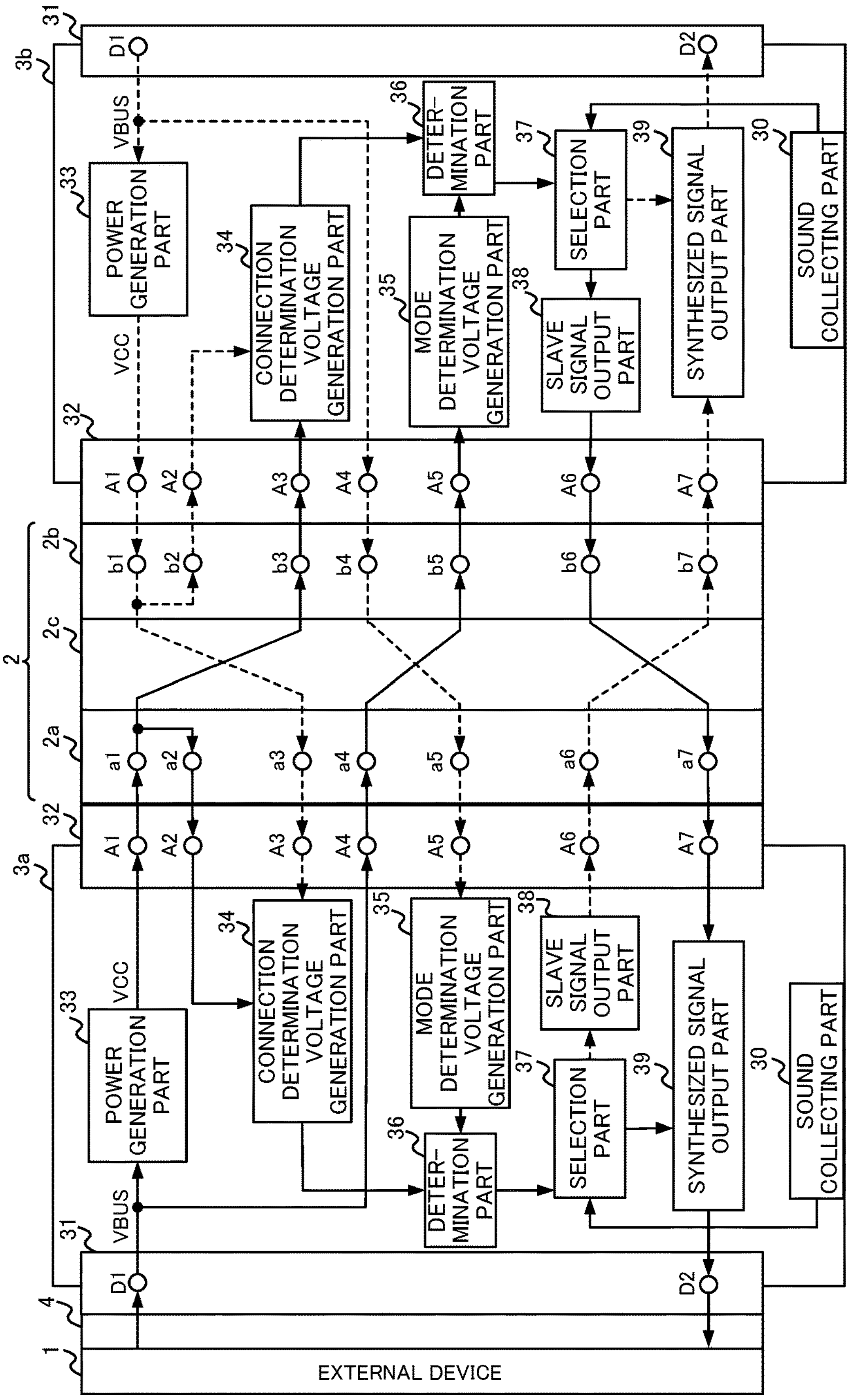
FIG. 2 shows an internal configuration of a microphone 3.

FIG. 2 shows an internal configuration of the microphone 3. Similar to FIG. 1, FIG. 2 shows a state in which the microphone 3*a* operates in the master mode, in which the microphone 3*a* is connected to the external device 1, and the microphone 3*b* operates in the slave mode, in which the microphone 3*b* is connected to the microphone 3*a*. The master mode is a mode in which electric power from a second connection port 32 is supplied to another microphone 3 (i.e., the microphone 3*b* in FIG. 2) connected via the cable 2. The slave mode is a mode in which electric power is supplied through the second connection port 32 from another microphone 3 (i.e., the microphone 3*b* in FIG. 2) connected via the cable 2.

Solid arrows in FIG. 2 indicate that a power supply or an electrical signal transmission is performed. Dashed arrows in FIG. 2 indicate that a power supply and an electrical signal transmission are not performed, despite it being possible that the ends of the arrows be electrically connected.

The microphone 3*a* is connected to the external device 1 through the first connection port 31. The first connection port 31 is a USB connector, for example. The microphone 3*a* receives a power VBUS from the external device 1 via the first connection port 31.

The microphone 3*a* and the microphone 3*b* are connected via the cable 2. The cable 2 connects the second connection port 32 of the microphone 3*a* to the second connection port 32 of the microphone 3*b*.

A connector 2*a* is provided at one end of the cable 2, and a connector 2*b* is provided at the other end of the cable 2. The connector 2*a* includes a terminal a1, a terminal a2, a terminal a3, a terminal a4, a terminal a5, a terminal a6, and a terminal a7. The connector 2*b* includes a terminal b1, a terminal b2, a terminal b3, a terminal b4, a terminal b5, a terminal b6, and a terminal b7. In the connector 2*a*, the terminal a1 and the terminal a2 are short-circuited. In the connector 2*b*, the terminal b1 and the terminal b2 are short-circuited. That is, in the cable 2, the terminal a1 connected to a power source of the microphone 3*a* and the terminal a2 connected to a connection determination voltage generation part 34, described later, are short-circuited. Further, in the cable 2, the terminal b1 connected to a power source of the microphone 3*b* and the terminal b2 connected to the connection determination voltage generation part 34 are short-circuited.

The connector 2*a* and the connector 2*b* are connected by a conductive line 2*c*. The terminal a1 of the connector 2*a* is connected to the terminal b3 of the connector 2*b*. The terminal a3 of the connector 2*a* is connected to the terminal b1 and the terminal b2 of the connector 2*b*. The terminal a4 of the connector 2*a* is connected to the terminal b5 of the connector 2*b*. The terminal a5 of the connector 2*a* is connected to the terminal b4 of the connector 2*b*. The terminal a6 of the connector 2*a* is connected to the terminal b7 of the connector 2*b*. The terminal a7 of the connector 2*a* is connected to the terminal b6 of the connector 2*b*.

The microphone 3 includes a sound collecting part 30, a first connection port 31, a second connection port 32, a power generation part 33, the connection determination voltage generation part 34, a mode determination voltage generation part 35, a determination part 36, a selection part 37, a slave signal output part 38, and a synthesized signal output part 39.

The sound collecting part 30 collects sound around the microphone 3. The sound collecting part 30 includes an electro-acoustic transducer element, and transduces the collected sound into the sound signal. The sound collecting part 30 outputs the sound signal to the selection part 37.

The first connection port 31 includes a terminal D1 and a terminal D2. The terminal D1 is connected to a power supply terminal of the external device 1 via the cable 4. The terminal D2 is connected to a sound input terminal of the external device 1 via the cable 4. In the example shown in FIG. 2, the terminal D1 of the microphone 3*a* is connected to the power generation part 33 of the microphone 3*a* and the terminal A4 of the microphone 3*a*. The terminal D2 of the microphone 3*a* is connected to the synthesized signal output part 39 of the microphone 3*a*. On the other hand, since the microphone 3*b* and the external device 1 are connected via the microphone 3*a*, the terminal D1 and the terminal D2 of the microphone 3*b* are in an open state.

The second connection port 32 includes a terminal A1, a terminal A2, a terminal A3, a terminal A4, a terminal A5, a terminal A6, and a terminal A7. These terminals are used for connecting to another microphone 3 (i.e., the microphone 3*b* in FIG. 2) via the cable 2.

The terminal A1 is connected to an output side of a power VCC in the power generation part 33. The power VCC is used as electric power for operating each unit of the microphone 3. The terminal A1 of the microphone 3*a* is connected to the terminal A3 of the microphone 3*b* via the terminal a1 of the connector 2*a* and the terminal b3 of the connector 2*b*. The terminal A3 of the microphone 3*b* is connected to the connection determination voltage generation part 34 of the microphone 3*b*. The power VCC input to the terminal A3 of the microphone 3*b* is used as electric power for operating each unit of the microphone 3*b*.

The terminal A1 of the microphone 3*a* is connected to the terminal A2 of the microphone 3*a* via the terminal a1 of the connector 2*a* and the terminal a2 of the connector 2*a*. The terminal A2 of the microphone 3*a* is connected to the connection determination voltage generation part 34 of the microphone 3*a*. By the above-described connections, the power generation part 33 of the microphone 3*a* supplies the generated power VCC to the connection determination voltage generation part 34 of the microphone 3*a* and the connection determination voltage generation part 34 of the microphone 3*b*.

On the other hand, the power generation part 33 of the microphone 3*b* does not generate a power VCC. Therefore, no electric power is supplied to the connection determination voltage generation part 34 of the microphone 3*a* from the microphone 3*b* via the terminal A3 of the microphone 3*a*.

The terminal A4 is connected to the terminal D1. The terminal A5 is connected to an input side of the mode determination voltage generation part 35. The terminal A4 of the microphone 3*a* is connected to the terminal A5 of the microphone 3*b* via the terminal a4 of the connector 2*a* and the terminal b5 of the connector 2*b*. The terminal A5 of the microphone 3*b* is connected to the mode determination voltage generation part 35 of the microphone 3*b*. Accordingly, the power VBUS is input to the mode determination voltage generation part 35 of microphone 3*b* through the terminal A4 of microphone 3*a*, the terminal a4 of the connector 2*a*, the terminal b5 of the connector 2*b*, and the terminal A5 of the microphone 3*b*.

On the other hand, the terminal D1 of the microphone 3*b* is not connected to the external device 1. Therefore, the power VBUS is not input to the mode determination voltage generation part 35 of the microphone 3*a*.

The terminal A6 is connected to an output side of the slave signal output part 38. The terminal A7 is connected to an input side of the synthesized signal output part 39. The terminal A6 of the microphone 3*b* is connected to the synthesized signal output part 39 of the microphone 3*a* via the terminal b6 of the connector 2*b*, the terminal a7 of the connector 2*a*, and the terminal A7 of the microphone 3*a*. Therefore, the sound signal output by the slave signal output part 38 of the microphone 3*b* is input to the synthesized signal output part 39 of the microphone 3*a* via the terminal A6 of the microphone 3*b*, the terminal b6 of the connector 2*b*, the terminal a7 of the connector 2*a*, and the terminal A7 of the microphone 3*a*.

On the other hand, in the microphone 3*a*, the selection part 37, described later, does not input a sound signal to the slave signal output part 38. Therefore, no sound signal is input to the synthesized signal output part 39 of the microphone 3*b* since the slave signal output part 38 of the microphone 3*a* does not output a sound signal. The operation details of the synthesized signal output part 39 will be described later.

The power generation part 33 of the microphone 3*a* receives the power VBUS from the external device 1 via the terminal D1. The power generation part 33 of the microphone 3*a* generates the power VCC, which is a second power supplied to the microphone 3*b* via the cable 2, on the basis of the power VBUS, which is a first power supplied from the external device 1. The power generation part 33 includes at least one of a protection circuit or a regulator, for example. The power generation part 33 of the microphone 3*a* supplies, via the cable 2, the power VCC to the connection determination voltage generation part 34 of the microphone 3*a* and the connection determination voltage generation part 34 of the microphone 3*b*.

On the other hand, the power generation part 33 of the microphone 3*b* does not operate since no electric power is supplied from the external device 1 to the power generation part 33 of the microphone 3*b*. Therefore, the power generation part 33 of the microphone 3*b* does not supply the power VCC to the connection determination voltage generation part 34 of the microphone 3*a* and the connection determination voltage generation part 34 of the microphone 3*b*.

The connection determination voltage generation part 34 receives, via the cable 2, the power VCC generated by the power generation part 33. The connection determination voltage generation part 34 generates, on the basis of the supplied power VCC, a connection determination voltage that is different for (i) a state where the cable 2 is connected and (ii) a state where the cable 2 is not connected. The connection determination voltage generation part 34 outputs the generated connection determination voltage to the determination part 36.

The connection determination voltage generation part 34 of the microphone 3*a* receives the power VCC generated by the power generation part 33 of the microphone 3*a* via the terminal a1 and the terminal a2 of the connector 2*a*. Since the power generation part 33 of the microphone 3*b* has not generated the power VCC, the connection determination voltage generation part 34 of the microphone 3*a* does not receive the power VCC from the power generation part 33 of the microphone 3*b* via the cable 2.

The connection determination voltage generation part 34 of the microphone 3*b* receives, via the cable 2, the power VCC generated by the power generation part 33 of the microphone 3*a*. However, the connection determination voltage generation part 34 of the microphone 3*b* does not receive the power VCC from the power generation part 33 of the microphone 3*b*.

When receiving the power VCC via the terminal A2 or the terminal A3, the connection determination voltage generation part 34 outputs a connection determination voltage (for example, a high-level voltage) indicating that the cable 2 has been connected. The connection determination voltage generation part 34 outputs a connection determination voltage (for example, a low-level voltage) indicating that the cable 2 has not been connected when the power VCC is not received via the terminal A2 or the terminal A3. The details of the connection determination voltage generation part 34 will be described later.

The mode determination voltage generation part 35 generates a mode determination voltage that is different for (i) a state where electric power (for example, VBUS) is supplied via the cable 2 and (ii) a state where no electric power is supplied via the cable 2. In the example shown in FIG. 2, the mode determination voltage generation part 35 generates a mode determination voltage indicating whether or not the power VBUS is received from another microphone 3 (i.e., the microphone 3*b* in FIG. 2) via the cable 2. The mode determination voltage generation part 35 outputs the generated mode determination voltage to the determination part 36.

The mode determination voltage generation part 35 of the microphone 3*b* receives the power VBUS output from the terminal A4 of the microphone 3*a*, via the cable 2 and the terminal A5 of the microphone 3*b*. On the other hand, since the power VBUS is not output from the terminal A4 of the microphone 3*b*, the mode determination voltage generation part 35 of the microphone 3*a* does not receive the power VBUS via the terminal A5 of the microphone 3*a*.

When the power VBUS is supplied via the terminal A5, the mode determination voltage generation part 35 outputs a mode determination voltage (for example, a high-level voltage) indicating that electric power is being supplied. When the power VBUS is not supplied through the terminal A5, the mode determination voltage generation part 35 outputs a mode determination voltage (for example, a low-level voltage) indicating that no electric power is being supplied. The mode determination voltage generation part 35 will be described in detail later.

The determination part 36 includes a central processing unit (CPU), for example. The determination part 36 determines whether the microphone 3 operates in the master mode or the slave mode by executing a program stored in a memory, for example.

When electric power is supplied from the external device 1 through the terminal D1 of the first connection port 31 and the cable 2 is connected to the second connection port 32, the determination part 36 determines that the microphone 3 operates in the master mode. On the other hand, when no electric power is supplied from the external device 1 through the terminal D1 of the first connection port 31 and the cable 2 is connected to the second connection port 32, the determination part 36 determines that the microphone 3 operates in the slave mode.

Specifically, the determination part 36 determines whether or not the cable 2 is connected on the basis of the connection determination voltage input from the connection determination voltage generation part 34. Further, the determination part 36 determines whether the microphone 3 operates in the master mode or the slave mode on the basis of the mode determination voltage input from the mode determination voltage generation part 35. The determination part 36 determines whether the microphone 3 operates in the master mode or the slave mode on the basis of combinations of the connection determination voltage and the mode determination voltage, for example.

When the mode determination voltage indicates that the power VBUS is not supplied via the cable 2 and the connection determination voltage indicates that the cable 2 is connected, the determination part 36 determines that the microphone 3 operates in the master mode. On the other hand, when the mode determination voltage indicates that the power VBUS is being supplied via the cable 2 and the connection determination voltage indicates that the cable 2 is connected, the determination part 36 determines that the microphone 3 operates in the slave mode.

The determination part 36 determines a route through which the sound signal input from the sound collecting part 30 is output on the basis of a determination result of whether the microphone 3 operates in the master mode or the slave mode. The determination part 36 notifies the selection part 37 of the determined route. Specifically, when it is determined that the microphone 3 operates in the master mode, the determination part 36 instructs the selection part 37 to output the sound signal input from the sound collecting part 30 to the synthesized signal output part 39. On the other hand, when it is determined that the microphone 3 operates in the slave mode, the determination part 36 instructs the selection part 37 to output the sound signal input from the sound collecting part 30 to the slave signal output part 38.

The selection part 37 switches between (i) outputting the sound signal input from the sound collecting part 30 to the slave signal output part 38 and (ii) outputting the sound signal input from the sound collecting part 30 to the synthesized signal output part 39 on the basis of the instruction acquired from the determination part 36. The selection part 37 of the microphone 3*a* outputs the sound signal input from the sound collecting part 30 of the microphone 3*a* to the synthesized signal output part 39 in response to receiving an instruction for operating in the master mode from the determination part 36. The selection part 37 of the microphone 3*b* outputs the sound signal input from the sound collecting part 30 of the microphone 3*b* to the slave signal output part 38 in response to receiving an instruction for operating in the slave mode from the determination part 36.

The slave sound signal from the selection part 37 of the microphone 3*b* is input to the slave signal output part 38 of the microphone 3*b* operating in the slave mode. Therefore, the slave signal output part 38 of the microphone 3*b* outputs, via the terminal A6, the slave sound signal to the synthesized signal output part 39 of the microphone 3*a* operating in the master mode. On the other hand, no slave sound signal from the selection part 37 of the microphone 3*a* is input to the slave signal output part 38 of the microphone 3*a* operating in the master mode. Therefore, the slave signal output part 38 of the microphone 3*a* outputs no slave sound signal via the terminal A6.

The synthesis signal output part 39 synthesizes a master sound signal input through the sound collecting part 30 and the slave sound signal received from the slave signal output part 38 of the microphone 3*b* operating in the slave mode. The synthesis signal output part 39 outputs a synthesized sound signal to the external device 1 via the terminal D2. The synthesized signal output part 39 of the microphone 3*a* synthesizes (i) the slave sound signal, which is an analog signal, and (ii) the master sound signal, which is an analog signal, and transduces the synthesized sound signal into a digital synthesized sound signal. The synthesized signal output part 39 outputs the digital synthesized sound signal to the external device 1 through the terminal D2 of the microphone 3*a*. The synthesized signal output part 39 of the microphone 3*b* does not operate since it does not receive a sound signal from the slave signal output part 38 and the selection part 37 of the microphone 3*a*.

When the synthesized signal output part 39 operates in this manner, the microphone 3*a* outputs, to the external device 1, a digital synthesized sound signal corresponding to a sound obtained by synthesizing (i) the sound collected by the sound collecting part 30 of the microphone 3*b* and (ii) the sound collected by the sound collecting part 30 of the microphone 3*a*. Power consumption required for the synthesized signal output part 39 to synthesize analog audio signals is smaller than power consumption required for synthesizing digital audio signals. Therefore, the synthesized signal output part 39 can reduce power consumption by generating the digital synthesized sound signal after synthesizing the analog sound signal input from the microphone 3*b* and the analog sound signal input from the sound collecting part 30. As a result, the synthesized signal output part 39 can generate the digital synthesized sound signal due to the power VBUS supplied from the external device 1 via the USB interface.

Microphone 3*a* Operating in a Stand-Alone Mode

Figure 3:
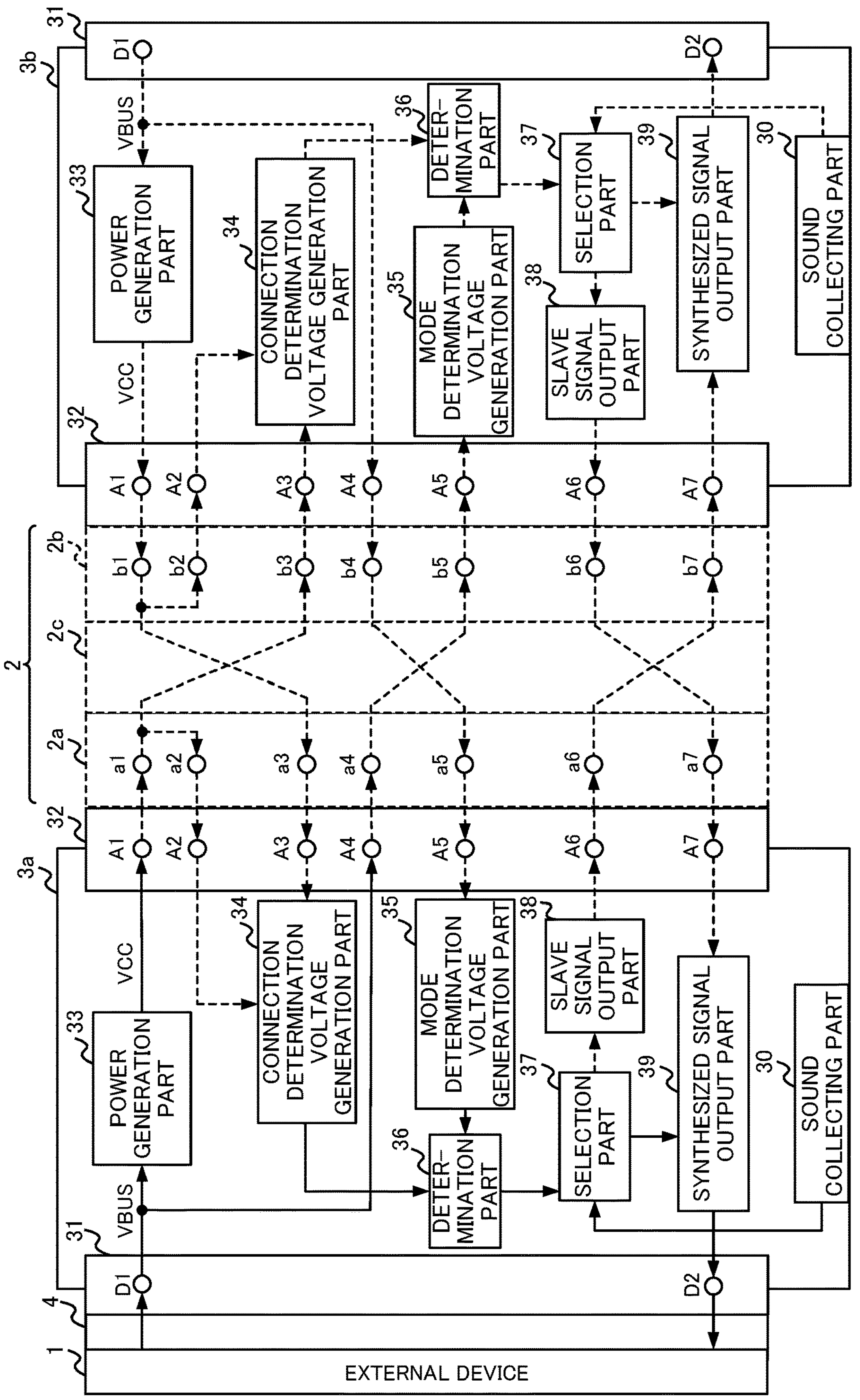
FIG. 3 shows a configuration in which a microphone 3*a* operates in stand-alone mode.

FIG. 3 shows a configuration in which the microphone 3*a* operates in a stand-alone mode. The microphone system S differs from the microphone system S shown in FIG. 2 in that the microphone 3*a* and the microphone 3*b* are not connected via the cable 2, and is the same in other respects. Since the microphone 3*b* is not connected to the microphone 3*a* via the cable 2, the microphone 3*b* does not operate.

When the cable 2 is not connected to the microphone 3*a*, the terminal A1 and the terminal A2 of the microphone 3*a* are not short-circuited. Therefore, the power VCC generated by the power generation part 33 of the microphone 3*a* is not input to the connection determination voltage generation part 34 of the microphone 3*a* via the terminal A2. The power VCC is not input to the connection determination voltage generation part 34 via the terminal A3. As a result, the connection determination voltage generation part 34 of the microphone 3*a* generates a connection determination voltage indicating that the cable 2 is not connected.

When the connection determination voltage indicates that the cable 2 is not connected, the determination part 36 of the microphone 3*a* determines that an operation mode of the microphone 3*a* is the stand-alone mode which is used without being connected to another microphone (for example, the microphone 3*b*). The determination part 36 of the microphone 3*a* notifies the selection part 37 of the microphone 3*a* that the microphone 3*a* operates in the stand-alone mode.

When receiving a notification that the microphone 3*a* operates in the stand-alone mode from the determination part 36, the selection part 37 of the microphone 3*a* outputs the sound signal input from the sound collecting part 30 of the microphone 3*a* to the synthesized signal output part 39. The synthesized signal output part 39 outputs, to the terminal D2, the sound signal input through the selection part 37 without synthesizing the sound signal with other sound signals. Since the microphone 3*a* operates in this manner, the microphone 3*a* outputs, to the external device 1, a digital sound signal corresponding to the sound collected by the sound collecting part 30 when the cable 2 is not connected.

Operations of the Connection Determination Voltage Generation Part 34 and the Mode Determination Voltage Generation Part 35

Figure 4A:
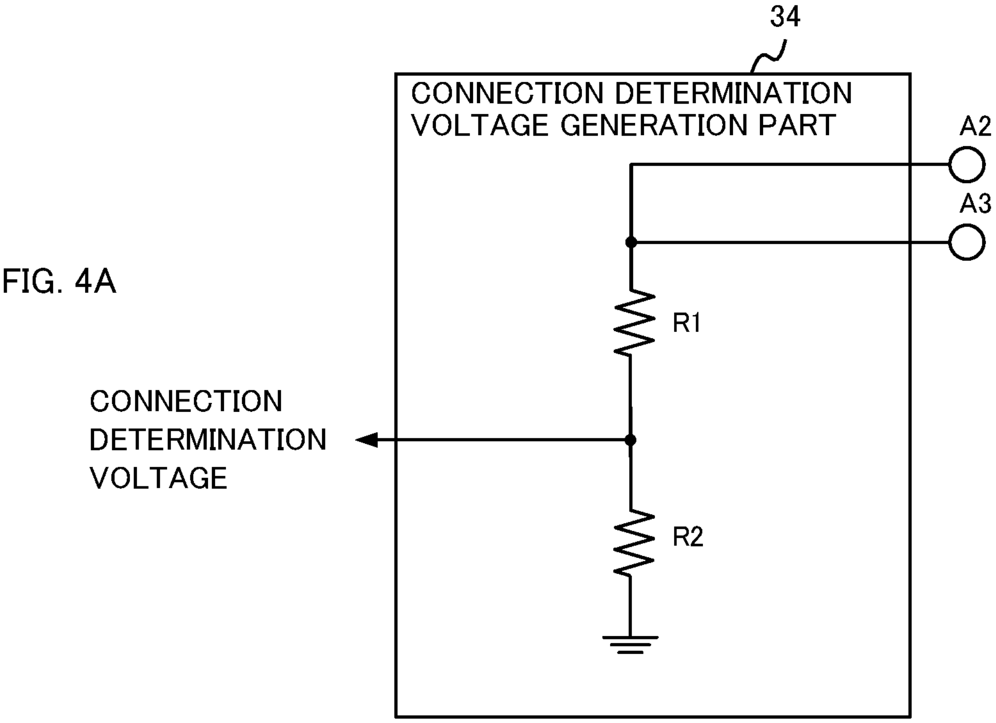
FIG. 4A shows an example of a voltage generation part of a connection determination voltage generation part 34.
Figure 4B:
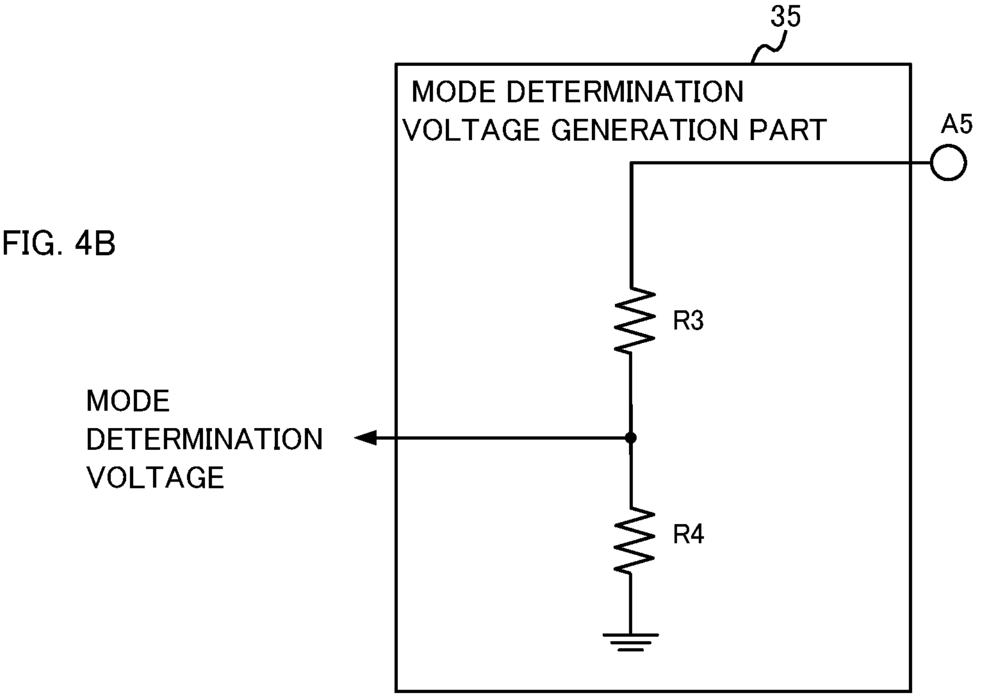
FIG. 4B shows an example of a voltage generation part of a mode determination voltage generation part 35.

FIG. 4A shows an example of a voltage generation part of the connection determination voltage generation part 34, and FIG. 4B shows an example of a voltage generation part of the mode determination voltage generation part 35.

The connection determination voltage generation part 34 shown in FIG. 4A includes a resistor R1 and a resistor R2. The resistor R1 and the resistor R2 are connected in series. One end of the resistor R1 is connected to the terminal A2 and the terminal A3, and the other end is connected to the resistor R2. One end of the resistor R2 is connected to the resistor R1, and the other end is connected to the ground. The connection determination voltage generation part 34 outputs, as the connection determination voltage, a voltage obtained by dividing a voltage input from the terminal A2 or the terminal A3 by the resistor R1 and the resistor R2.

When no electric power is supplied from the terminal A2 and the terminal A3, the connection determination voltage generation part 34 outputs a voltage of 0 volts as the connection determination voltage. On the other hand, when electric power is supplied from the terminal A2 or the terminal A3, the connection determination voltage generation part 34 outputs a voltage represented by the following Equation 1 as the connection determination voltage:

$$R2/(R1+R2)\times V1 \qquad (1)$$

V1 in Equation 1 is the voltage of the terminal A2 or the terminal A3.

The mode determination voltage generation part 35 shown in FIG. 4B includes a resistor R3 and a resistor R4. The resistor R3 and the resistor R4 are connected in series. One end of the resistor R3 is connected to the terminal A5, and the other end is connected to the resistor R4. One end of the resistor R4 is connected to the resistor R3, and the other end is connected to the ground. The mode determination voltage generation part 35 outputs, as the mode determination voltage, a voltage obtained by dividing a voltage input from the terminal A5 by the resistor R3 and the resistor R4.

When no electric power is supplied from the terminal A5, the mode determination voltage generation part 35 outputs a voltage of 0 volts as a mode determination voltage. On the other hand, when electric power is supplied from the terminal A5, the mode determination voltage generation part 35 outputs a voltage represented by the following Equation 2 as the mode determination voltage:

$$R4/(R3+R4)\times V2 \qquad (2)$$

V2 in Equation 2 is the voltage of the terminal A5.

In the example shown in FIG. 2, the mode determination voltage generation part 35 outputs a mode determination voltage that is different depending on whether the power VBUS is supplied through the terminal A5. However, the mode determination voltage generation part 35 may output a mode determination voltage that is different depending on whether another electric power is supplied. Another electric power is the power VCC, for example. For example, when the output side of the power generation part 33 is connected to the terminal A4, the mode determination voltage generation part 35 may output a mode determination voltage that is different according to whether or not the power VCC is supplied through the terminal A5. The configurations of the connection determination voltage generation part 34 and the mode determination voltage generation part 35 are not limited to those shown in FIGS. 4A and 4B, and may be formed by other circuits such as a logic circuit.

Operation of the Determination Part 36

FIG. 5 shows determination results of the determination part 36 based on the connection determination voltages and the mode determination voltages. "H" of the connection determination voltage indicates that a value of the connection determination voltage is a high-level voltage equal to or greater than a first threshold value. "L" of the connection determination voltage indicates that a value of the connection determination voltage is a low-level voltage lower than the first threshold value. "H" of the mode determination voltage indicates that a value of the mode determination voltage is a high-level voltage equal to or greater than a second threshold value. "L" of the mode determination voltage indicates that a value of the mode determination voltage is a low-level voltage lower than the second threshold value. When the connection determination voltage is "L", the power VBUS is not supplied to the mode determination voltage generation part 35 through the terminal A5. Therefore, a state in which the connection determination voltage is "L" and the mode determination voltage is "H" does not occur.

The first threshold value is used for determining a connection state of the cable 2. The first threshold value is a value calculated by Equation 1 when a voltage based on the power VCC input from the terminal A2 or the terminal A3 is the assumed minimum voltage, for example. The assumed minimum voltage is the minimum voltage in a range in which the voltage of the terminal A2 or the terminal A3 can be varied due to variation of the power generation part 33, temperature change, or the like. The second threshold value is used to determine the operation mode of the microphone 3. The second threshold value is a value calculated by Equation 2 when a voltage based on the power VBUS input from the terminal A5 is the assumed minimum voltage, for example. The assumed minimum voltage is the minimum voltage in a range in which the voltage of the terminal A5 can be varied due to variation in the voltage output from the external device 1, variation in the cable 4, temperature change, or the like.

When the connection determination voltage is "H" and the mode determination voltage is "L", the determination part 36 determines that the operation mode of the microphone 3 is the master mode. When the connection determination voltage is "H" and the mode determination voltage is "H", the determination part 36 determines that the operation mode of the microphone 3 is the slave mode. When the connection determination voltage is "L", the determination part 36 determines that the operation mode of the microphone 3 is the stand-alone mode.

When the connection determination voltage is "L" and the mode determination voltage is "H," it is conceivable that the cable 2 is broken between the terminal a1 and the terminal a2, and therefore the determination part 36 determines that the connection determination voltage is in an abnormal state, for example. In this case, the determination part 36 may transmit, to the external device 1, abnormality notification data for causing the external device 1 to display that an abnormality has occurred, or may display that the abnormality has occurred on an indicator (not shown) of the microphone 3*a*. The determination part 36 may display, on the indicator, information indicating whether the microphone 3 is operating in the master mode, the slave mode, or the stand-alone mode.

Figure 6:
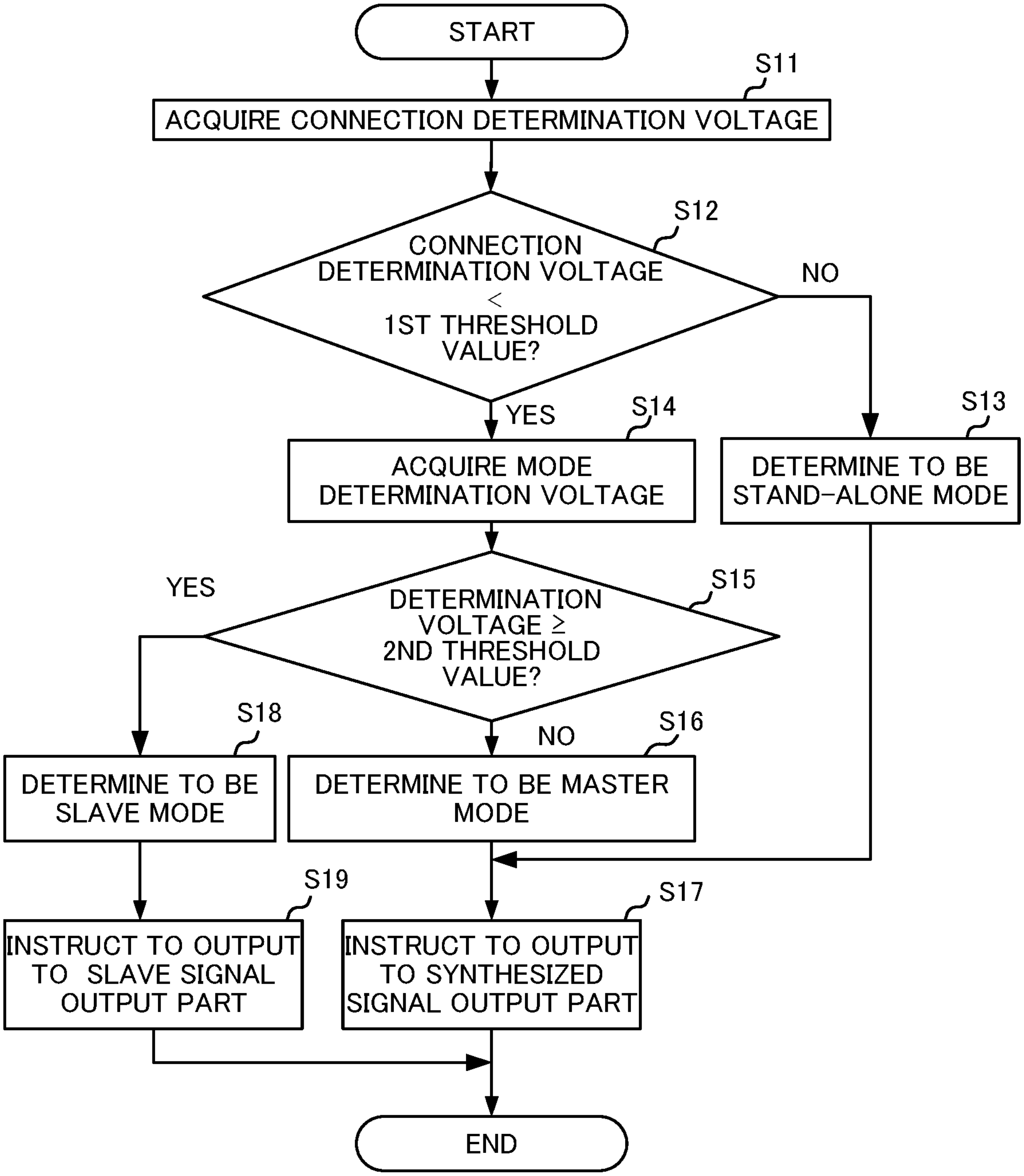
FIG. 6 shows a flowchart of operations of the determination part 36.

FIG. 6 shows a flowchart of operations of the determination part 36. First, the determination part 36 acquires the connection determination voltage from the connection determination voltage generation part 34 (S11). When the acquired connection determination voltage is less than the first threshold value (NO in S12), the determination part 36 determines that the microphone 3 operates in the stand-alone mode (S13). Then, the determination part 36 instructs the selection part 37 to output the sound signal input from the sound collecting part 30 to the synthesized signal output part 39 (S17). On the other hand, when the connection determination voltage is equal to or greater than the first threshold value (YES in S12), the determination part 36 acquires the mode determination voltage from the mode determination voltage generation part 35 (S14).

When the acquired mode determination voltage is less than the second threshold value (NO in S15), the determination part 36 determines that the operation mode of the microphone 3 is the master mode (S16). Then, the determination part 36 instructs the selection part 37 to output the sound signal input from the sound collecting part 30 to the synthesized signal output part 39 (S17). On the other hand, when the acquired mode determination voltage is equal to or greater than the second threshold value (YES in S15), the determination part 36 determines that the operation mode of the microphone 3 is the slave mode (S18). Then, the determination part 36 instructs the selection part 37 to output the sound signal input from the sound collecting part 30 to the slave signal output part 38 (S19).

The order in which the determination part 36 executes the processing is not limited to the order shown in FIG. 6. The determination part 36 may perform the determination based on the mode determination voltage before the determination based on the connection determination voltage.

First Modified Example

In the above description, the configuration in which the sound collecting part 30 collects the surrounding sound to generate the sound signal has been exemplified. However, the sound collecting part 30 may acquire a sound signal from an external microphone and input the acquired sound signal to the selection part 37.

Second Modified Example

Figure 7:
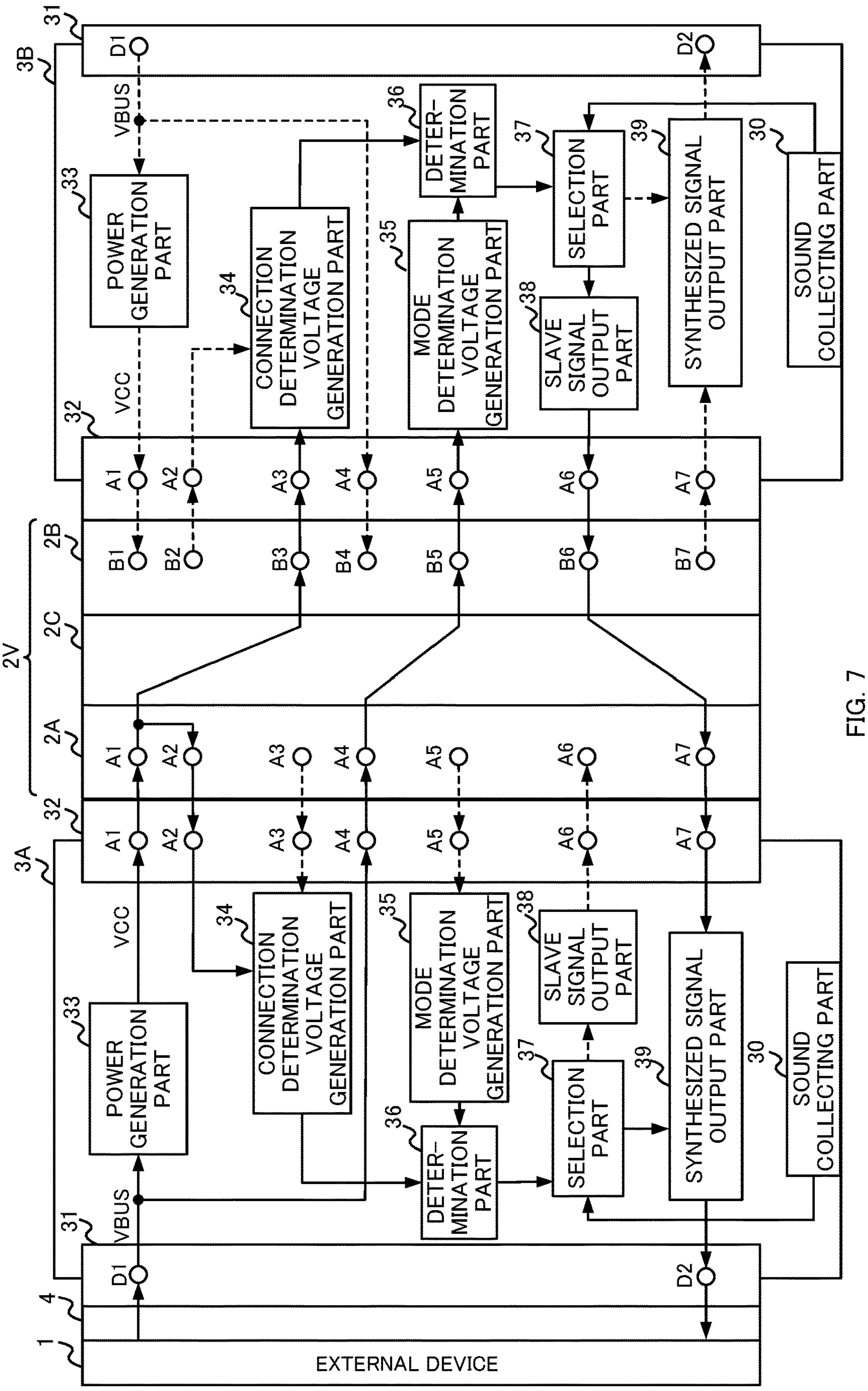
FIG. 7 shows a state where the microphone 3*a* and a microphone 3*b* are connected with a polarized cable 2V.
Figure 8:
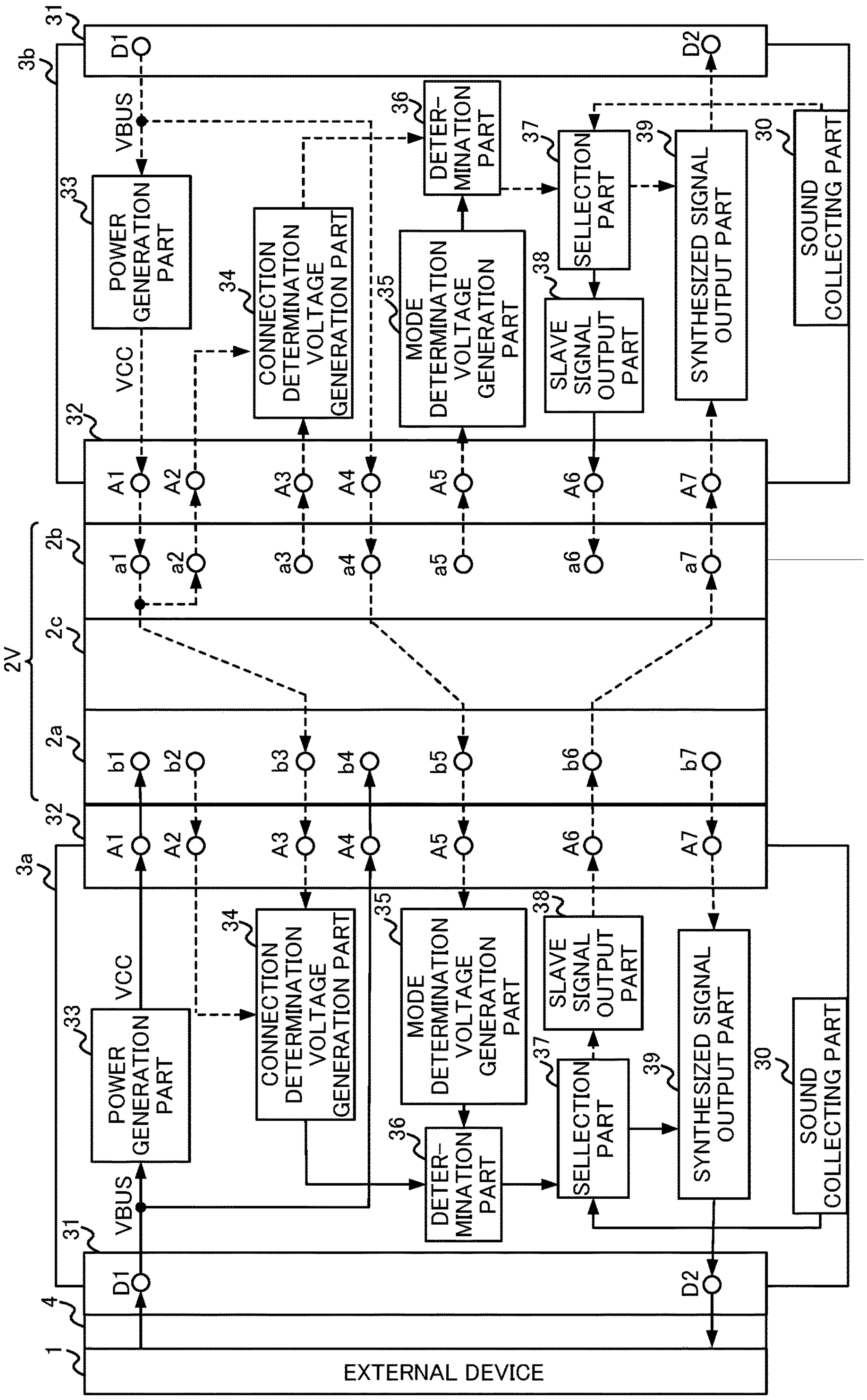
FIG. 8 shows a state where the microphone 3*a* and the microphone 3*b* are connected with the polarized cable 2V.

Cases where the cable 2 has no polarity have been exemplified in the above description, however the cable 2 may have polarity. FIGS. 7 and 8 each show a state in which the microphone 3*a* and the microphone 3*b* are connected by a polarized cable 2V.

In the cable 2V shown in FIGS. 7 and 8, the terminal a3 and the terminal b1, the terminal a5 and the terminal b4, the terminal a6 and the terminal b7, and the terminal b1 and the terminal b2 are not connected to each other, respectively. The connector 2*a* functions as a connector connected to the microphone 3*a* that operates in the master mode, and the connector 2*b* functions as a connector connected to the microphone 3*b* that operates in the slave mode.

The connector 2*a* and the connector 2*b* may have different aspects so that a user of the microphone system S connects the connector 2*a* to the microphone 3*a* which is used in the master mode and connects the connector 2*b* to the microphone 3*b* which is used in the slave mode. For example, the connector 2*a* is marked with a mark (for example, M) indicating that it is for a master device, and the connector 2*b* is marked with a mark (for example, S) indicating that it is for a slave device.

FIG. 7 shows a state where the cable 2V is connected with correct polarity. In this case, as in the case shown in FIG. 2, the microphone 3*a* operates in the master mode, and the microphone 3*b* operates in the slave mode.

FIG. 8 shows a state in which the cable 2V is connected with incorrect polarity. In this case, since the power VCC is not supplied to the connection determination voltage generation part 34, the connection determination voltage is "L". Since no electric power is supplied to the mode determination voltage generation part 35, the mode determination voltage is also "L". As a result, the determination part 36 determines that the microphone 3*a* is in the stand-alone mode. In this case, the determination part 36 displays on the indicator that the microphone 3*a* is operating in the stand-alone mode. Since no electric power is supplied to the microphone 3*b*, the microphone 3*b* does not operate.

In the cable 2V shown in FIGS. 7 and 8, the terminal b1 and the terminal b2 may be connected to each other. When the cable 2V is connected with incorrect polarity, the connection determination voltage becomes "H" since the power VCC is supplied to the connection determination voltage generation part 34, and the determination part 36 determines that the microphone 3*a* is in the master mode. However, since no sound signal is input from the microphone 3*b* to the synthesized signal output part 39 via the terminal A7, the microphone 3*a* substantially operates in the stand-alone mode.

Effects of the Microphone 3 according to the Present Embodiment

As described above, the microphone 3 includes the mode determination voltage generation part 35 that generates the mode determination voltage, the connection determination voltage generation part 34 that generates the connection determination voltage, and the determination part 36 that determines the operation mode of the microphone 3 on the basis of the mode determination voltage and the connection determination voltage. Then, the determination part 36 determines the operation mode of the microphone 3 on the basis of the mode determination voltage and the connection determination voltage. The selection part 37 determines whether to output the sound signal on the basis of the sound collected by the sound collecting part 30 to another microphone 3 (i.e., the microphone 3*b*) or the external device 1 based on the determination result of the determination part 36.

Therefore, the microphone system S can connect a plurality of microphones with a simple configuration without using a conversion device other than the plurality of microphones 3. For example, the microphone 3*a* and the microphone 3*b* are connected to each other via the cable 2 and the microphone 3*a* is connected to the external device 1, whereby the microphone system S can input sounds collected by the plurality of microphones 3 to the external device 1. As a result, the user can easily connect the plurality of microphones 3 to the external device 1.

Further, the microphone 3 of the present disclosure determines the operation mode according to the connection states of a cable to the microphone 3, and determines whether to output the sound signal to another microphone 3 (i.e., the microphone 3*b*) or to the external device 1. For example, the microphone 3 determines to operate in the master mode when the cable 4 is connected to the external device 1. Therefore, it is not necessary for the user to switch a switch provided in the microphone 3 depending on whether the microphone 3 is used as the master device or the slave device. Further, it is difficult for the user to operate the microphone 3 that is intended to operate in the slave mode in the master mode. Further, since it is not necessary to connect the microphone 3 to an external power source in the microphone system S, there is no possibility of the power supply being erroneously input to the microphone 3.

Further, in the microphone system S, the external device 1 and the microphone 3*a* used as the master device are connected by the cable 4, and the microphone 3*a* and the microphone 3*b* used as the slave device are connected by the cable 2, whereby electric power is supplied to the plurality of microphones 3. As a result, since there is no need to connect a power cable and the microphone 3, the user does not accidentally connect the power cable to the microphone 3*b* used as the slave device, for example.

The present disclosure is explained based on the exemplary embodiments. The technical scope of the present disclosure is not limited to the scope explained in the above embodiments and it is possible to make various changes and modifications within the scope of the disclosure. For example, all or part of the apparatus can be configured with any unit which is functionally or physically dispersed or integrated. Further, new exemplary embodiments generated by arbitrary combinations of them are included in the exemplary embodiments. Further, effects of the new exemplary embodiments brought by the combinations also have the effects of the original exemplary embodiments.

What is claimed is:

1. A microphone which comprises is a first microphone that is configured to connect to (i) an external device capable of supplying electric power and (ii) a second microphone, the first microphone comprising:

a first connection port configured for connecting to the external device;

a second connection port configured for connecting to the second microphone via a cable;

a synthesized signal output part configured for connecting to the first connection port and for connecting to the second connection port;

a determination part that:

is configured to determine to operate in a master mode, comprising supplying electric power through the second connection port to the second microphone connected via the cable, in response to a state wherein the cable is connected to the second connection port concurrent with electric power being supplied from the external device through the first connection port, and is configured to determine to operate in a slave mode, comprising receiving electric power through the second connection port from the second microphone connected via the cable, in response to the cable being is connected to the second connection port concurrent with a state where no electric power is supplied from the external device through the first connection port;

a sound collecting part configured collect a sound from around the first microphone and transduce the collected sound into a sound signal;

a selection part configured to:

output to the synthesized signal output part the sound signal input from the sound collecting part and a slave sound signal received from a slave signal output part of the second microphone, in response to receiving an instruction for operating in the master mode from the determination part, and output the sound signal, input from the sound collecting part, to the slave signal output part that outputs to the second microphone, in response to receiving an instruction for operating in the slave mode from the determination part.

2. The microphone according to claim 1, wherein the first microphone further comprises a power generation part configured to generate a second electric power supplied to the second microphone operating in the slave mode via the cable, on the basis of a first electric power supplied from the external device, in the state of operating in the master mode.

3. The microphone according to claim 1, wherein the first microphone further comprises a mode determination voltage generation part configured to generate a mode determination voltage that is different for a state where electric power is supplied via the cable than for a state where no electric power is supplied via the cable, and wherein the determination part is further configured to determine whether to operate in the master mode or the slave mode on the basis of the mode determination voltage.

4. The microphone according to claim 3, wherein the first microphone further comprises a connection determination voltage generation part configured to generate a connection determination voltage that is different for a state where the cable is connected than for a state where the cable is not connected, wherein the determination part is further configured to determine whether or not the cable is connected on the basis of the connection determination voltage.

5. The microphone according to claim 4, wherein the determination part is further configured to:

determine to operate in the master mode when the mode determination voltage indicates that no electric power is supplied via the cable and the connection determination voltage indicates that the cable has been connected, and determine to operate in the slave mode when the mode determination voltage indicates that electric power is supplied via the cable and the connection determination voltage indicates that the cable has been connected.

6. The microphone according to claim 4, wherein the determination part is further configured to determine to operate in a stand-alone mode, which is used without being connected to the second microphone, in response to the connection determination voltage indicating that the cable is not connected.

7. The microphone according to claim 1, wherein:

the slave signal output part is further configured to output a slave sound signal, input via an electro-acoustic transducer element, to the second microphone operating in the master mode, when operating in the slave mode; and the synthesized signal output part is further configured to synthesize a master sound signal input via the electro-acoustic transducer element and the slave sound signal received from the second microphone operating in the slave mode, when the first microphone is operating in the master mode, and to output a synthesized sound signal to the external device.

8. The microphone according to claim 7, wherein the selection part is further configured to output the slave sound signal to the slave signal output part when operating in the slave mode, and to output the master sound signal to the synthesized signal output part when operating in the master mode.

9. The microphone according to claim 7, wherein the synthesized signal output part is further configured to synthesize the slave sound signal, which is an analog signal, and the master sound signal, which is an analog signal, to transduce the synthesized sound signal into a digital synthesized sound signal, and to output the digital synthesized sound signal to the external device.

10. A microphone system, comprising:

a first microphone;

a second microphone configured as connectable to the first microphone; and a cable configured for connecting the first microphone and the second microphone, wherein the first microphone and the second microphone each include:

a first connection port for connecting to an external device capable of supplying electric power;

a second connection port for connecting to another microphone among the first microphone and the second microphone via the cable;

a determination part that is configured to determine to operate in a master mode, in which electric power is supplied through the second connection port to the another microphone connected via the cable, when the cable is connected to the second connection port in a state where electric power is supplied from the external device through the first connection port, and determine to operate in a slave mode, in which electric power is supplied through the second connection port from the another microphone connected via the cable, when the cable is connected to the second connection port in a state where no electric power is supplied from the external device through the first connection port; and a selection part that is configured to output a sound signal, input from a sound collecting part that collects surrounding sound, transduce the surrounding sound into the sound signal, to the synthesized signal output part that synthesizes the sound signal and a sound signal received from the another microphone, in response to receiving an instruction for operating in the master mode from the determination part, and to output the sound signal, input from the sound collecting part to a slave signal output part that outputs the another microphone, in response to receiving an instruction for operating in the slave mode from the determination part.

11. The microphone system according to claim 10, wherein the first microphone and the second microphone each further include:

a connection determination voltage generation part configured to generate a connection determination voltage that is different for a state where the cable is connected and a state where the cable is not connected, and in the cable, a terminal connected to a power source of the first microphone and a terminal connected to a power source of the second microphone are short-circuited with a terminal connected to the connection determination voltage generation part.

12. The microphone system according to claim 10, wherein the first microphone that operates in the master mode further includes a synthesized signal output part that synthesizes a master sound signal input via an electro-acoustic transducer element and a slave sound signal received from the second microphone that operates in the slave mode, and is configured to output a synthesized sound signal to the external device, and the second microphone that operates in the slave mode further includes the slave signal output part that outputs the slave sound signal input via the electro-acoustic transducer element to the first microphone.

* * * * *